Patented Jan. 30, 1923.

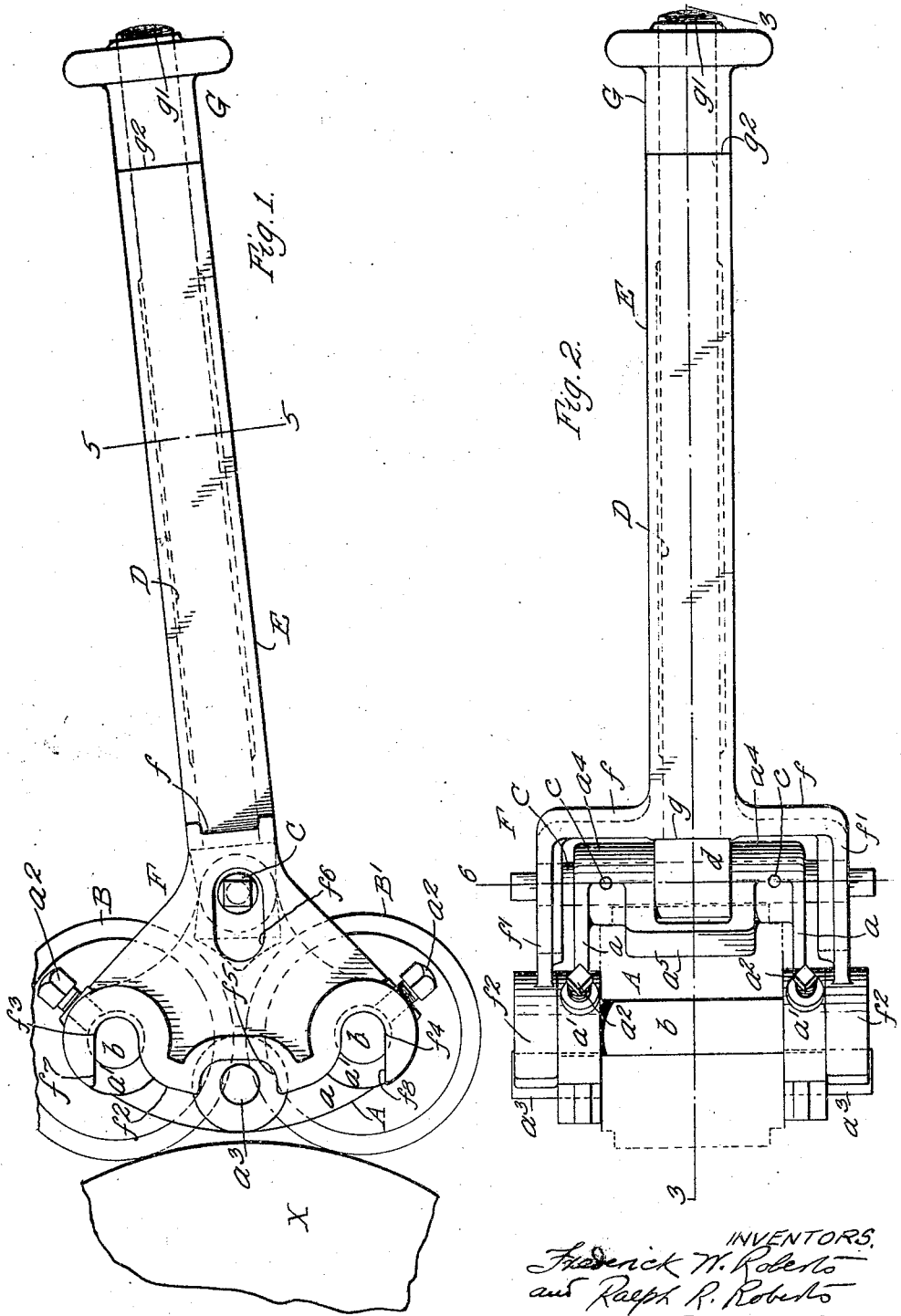

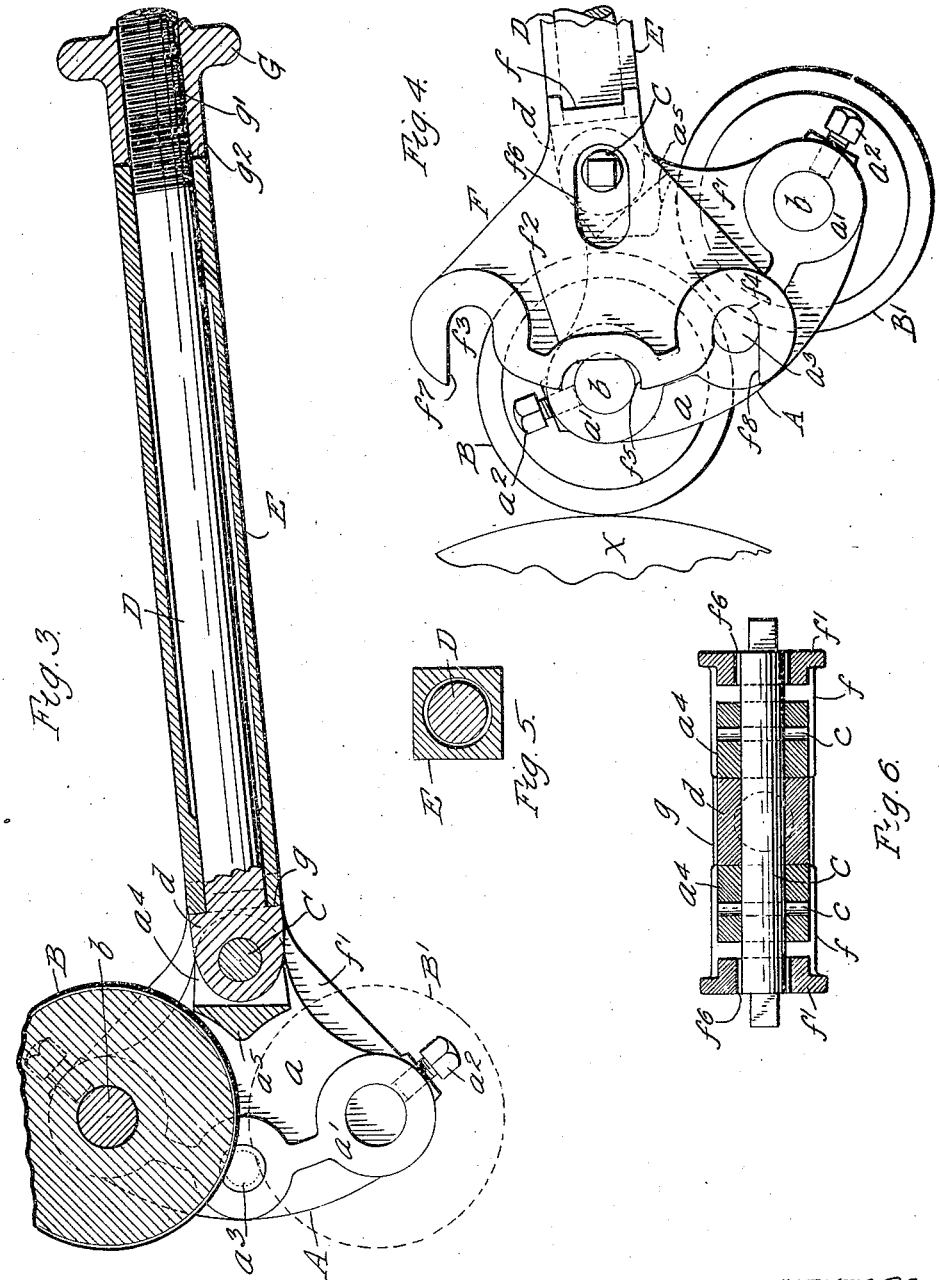

1,443,504

UNITED STATES PATENT OFFICE.

FREDRICK W. ROBERTS AND RALPH R. ROBERTS, OF LOCKPORT, NEW YORK, ASSIGNORS TO ROBERTS MANUFACTURING CO., OF LOCKPORT, NEW YORK.

HOLDING DEVICE FOR DRESSING TOOLS OR THE LIKE.

Application filed January 30, 1920. Serial No. 355,267.

*To all whom it may concern:*

Be it known that we, FREDRICK W. ROBERTS and RALPH R. ROBERTS, citizens of the United States, residing at Lockport, in the county of Niagara and State of New York, have invented a new and useful Improvement in Holding Devices for Dressing Tools or the like, of which the following is a specification.

This invention relates to improvements in holding devices for burrs, dressing or facing tools or cutters of the sort used for dressing or preparing the surfaces of pulp grinding stones or for similar purposes.

In the grinding of pulp wood by means of grindstones, it has been found that better results are obtained by using stones having a grinding surface produced by dressing the grinding stone with two or more dressing tools having different surfaces. A burr or dressing tool is usually arranged in a holder which is clamped in a tool carriage movable crosswise of the face of the stone, and in order to produce the desired surface it is necessary to take one burr holder out of the carriage and replace it by another. Since the tool carriages are usually arranged in places under the grinding machine which are difficult of access, the changing of burrs is a rather difficult and inconvenient operation and is therefore often neglected, which results in the production of an inferior grade of pulp.

The objects of the present invention are to provide an improved holding device which may be clamped to the carriage and on which two or more dressing tools may be secured, any of which may be placed into operative relation to the grinding stone without removing the holder from the carriage; also to provide a holding device of this kind with means for enabling the burrs or tools to be easily placed into and out of operative relation to the stone and for holding the burrs securely in the positions in which they are set; also to so construct the holding device that the burrs can be placed into a position in which a plurality of burrs engage the stone at the same time; also to provide a holder which is so constructed that when a plurality of burrs are in operative relation to the stone at the same time, the burrs will have a limited movement relatively to the holder so as to permit the burrs to adjust themselves relatively to the stone; also to improve the construction of holding devices of this sort in other respects hereinafter specified.

The tool holding device is hereinafter described as used in connection with burrs for facing or dressing grindstones for grinding wood pulp, but it will be understood that it is not intended to limit the invention to this use, since the holding device may be used in connection with other kinds of tools and for operating on work other than grindstones.

In the accompanying drawings:

Fig. 1 is a side elevation of a holding device embodying the invention and showing the parts thereof in position for placing two dressing tools in operative relation to the pulp grinding stone.

Fig. 2 is a top plan view thereof, with the dressing tools omitted.

Fig. 3 is a longitudinal sectional elevation thereof on line 3—3 Fig. 2 and with one of the dressing tools omitted to more clearly show the holding device.

Fig. 4 is a fragmentary side elevation of the device showing the two dressing tools secured thereon and one of them in operative position.

Fig. 5 is a transverse section of the supporting member of the device on line 5—5 Fig. 1.

Fig. 6 is a transverse sectional elevation of the device on line 6—6 Fig. 2.

Briefly stated the tool holding device embodying the invention includes a tool carrying head on which one or more burrs or facing tools are journalled and which is pivoted to swing any of the tools or burrs into operative relation to the work. This movable head is pivotally mounted upon a stem or rod and the pivoted head and the stem to which it is connected are both mounted on a stationary frame member or holder which is rigidly secured on the tool carriage (not shown) on which the tool holding device is adapted to be used, the frame member and pivoted head being provided with interlocking parts to confine the pivoted head in any desired position.

A represents the tool holding head or member on which a number of tools or burrs are mounted, two burrs or dressing tools B and B' being employed in the construction shown. This tool holding head may be of any suitable construction, that shown comprising webbed portions $a$ having bosses or enlarged portions $a'$ which form seats for the ends of the shafts $b$ on which the burrs B and B' are arranged, the shafts in the construction shown being rigidly held in the bosses by means of set screws $a^2$. The webbed portions $a$ are also provided with outwardly extending studs $a^3$, the object of which will be hereinafter explained. The tool holding head is provided with two sleeve portions $a^4$, in which a bearing pin C is secured, preferably by pins $c$ passing through the sleeve portions $a^4$ and the bearing pin C. The two portions of the tool holding head A are connected by means of a yoke $a^5$ formed integral with the sleeve portions $a^4$.

The tool holding head A is pivoted to an outer enlarged head $d$ of a rod or stem D, the enlarged portion $d$ being arranged between the two sleeve portions $a^4$ of the tool holding head and the pin C passes through a hole in the enlarged portion $d$ of the stem or rod D, so that the tool carrying head can swing about the axis of the bearing pin C.

The stationary or supporting frame for the tool holding head A and the stem or rod D may be of any suitable construction adapted to hold the pivoted head in various positions in which one or another or two tools may be placed into operative relation to the work. In the construction shown for this purpose the stationary frame member includes a shank portion E which is made of any suitable cross section adapting it to be clamped in tool carriages as commonly used, the shank portion shown being substantially square in cross section, and an outer forked or supporting portion F which is preferably formed integral with the shank portion E. The outer forked portion F in the construction shown, includes arms $f$ extending laterally from the shank portion E and outwardly and forwardly extending sides or webbed portions $f'$ which are adapted to support the tool holding head A in its several positions. For this purpose the webbed portions $f'$ may be provided at their outer edges with enlarged or flanged edges $f^2$ having upper and lower recesses $f^3$ and $f^4$ and intermediate recesses $f^5$. These recesses are adapted to receive the studs $a^3$ extending outwardly from the opposite sides of the pivoted tool carrying head A and the upper and lower recesses $f^3$ and $f^4$ are preferably made of such size as to hold the studs in these recesses substantially against movement. The intermediate recesses $f^5$, however, are made considerably larger than the studs $a^3$ so that when the tool holding head A is in the position shown in Fig. 1 the recesses $f^3$ will permit the studs $a^3$ to move to a considerable extent, thus permitting the tool holding head to move relatively to the rigid frame member so that the two burrs may adjust themselves relatively to the stone or work X to enable both burrs to bear with substantially equal pressure against the work. The webbed portions $f'$ of the outer supporting portion F are preferably provided with slots $f^6$ through which the bearing pin C extends and which permit the bearing pin to move in a direction substantially lengthwise of the shank portion E, to a limited extent. The ends of the bearing pin C extending beyond the webbed portions or sides $f'$ are preferably made square or of other shape adapted to cooperate with a wrench, so that by turning the bearing pin C the tool holding head A may be moved to its different positions relatively to the rigid frame or supporting member.

By means of the construction described the tool holding head A may be moved outwardly with regard to the outer forked portion F of the rigid frame member so that the studs $a^3$ extend beyond the flanged portion $f^2$ thereof. The tool holding head may then be swung, in the construction shown, into three different positions. If the studs $a^3$ are moved into the upper recesses $f^3$, the lower burr will be held in operative relation to the grindstone. If the studs $a^3$ are placed into the intermediate recesses $f^5$ both burrs or tools are adapted to operate on the stone. If the studs $a^3$ enter into the lower recesses $f^4$ the upper burr will be placed into operative relation to the stone. The flanged parts $f^2$ of the webbed portions $f'$ terminate at their upper and lower ends in outwardly projecting parts $f^7$ and $f^8$ which form stops for the studs $a^3$ to limit the swinging movement of the tool holding head A in opposite directions when the studs $a^3$ are out of the recesses.

In order to hold the tool holding head A in the desired position relatively to the rigid frame member, means are preferably provided for locking the stem or rod D relatively to the shank portion E of the rigid frame member. For this purpose the enlarged front portion $d$ of the rod D is provided with shoulders adapted to bear against corresponding shoulders $g$ formed on the outer portion of the shank E. The opposite end of the rod or stem D is threaded as shown at $g'$ and a nut or hand wheel G is provided which is internally threaded to cooperate with the threads of the rod D and which has a shoulder $g^2$ adapted to bear against the adjacent end of the shank E to draw the rod or stem D rearwardly to a position in which the shoulder of the enlarged portion $d$ bears against the shoulder $g$ of the shank E.

In the use of this device, if it is desired to change from one burr to another the nut or hand wheel G is first turned to move out of engagement with the end of the shank E and the hand wheel is then pushed forwardly moving the rod or stem D, and the tool holding head A pivoted thereto, forwardly so that the studs $a^3$ will be out of engagement with the recesses in the forked portion of the rigid frame member. A wrench may then be placed into engagement with one or another end of the bearing pin C so as to swing the tool holding head A into the desired position in which the studs $a^3$ will enter into another recess. The hand wheel G is then again turned on the screw threaded stem into engagement with the shank portion E to hold the tool holding head in the desired position. In this manner one or another burr can easily be placed into a position to operate on the work without necessitating the removal of the entire burr holder from the tool carriage. The device described also has the advantage that two burrs can be simultaneously placed into engagement with the stone or other work in such a manner that the burrs will bear equally against the work.

We claim as our invention:

1. In a tool holding device, the combination of a pivoted tool-carrying member having a relatively fixed pivotal axis and having means for supporting a plurality of tools, a supporting member having a plurality of recesses therein and movable toward and from the axis of said tool-carrying member, and a part on said tool-carrying member for engaging one of said recesses for presenting one or another of the tools to the work.

2. In a tool holding device, the combination of a supporting member having a shank portion, a tool carrying member movable thereon and having means for supporting a plurality of tools, and means on said holding device to permit any of said tools to be positioned in operative relation to the work, and a part extending lengthwise of said shank portion for holding said tool carrying member in operative relation to said supporting member.

3. In a tool holding device, the combination of a supporting member, a tool carrying member movable thereon and having means for supporting a plurality of tools, cooperating parts on said members whereby any tool may be held in operative relation to the work, said cooperating parts also acting to permit two tools to be simultaneously positioned and held in operative relation to the work, and means for permitting a relative movement between said supporting member and said tool carrying member when said tool carrying member is in a position to hold two tools in operative relation to the work.

4. In a tool holding device, the combination of a supporting member, a tool carrying member movable thereon and having means for supporting a plurality of tools means on said holding device to permit any of said tools to be positioned and held in operative relation to the work, and means for permitting a plurality of tools to be simultaneously positioned and held in operative relation to the work, said means permitting said tools to move to a limited extent relatively to said supporting member.

5. In a tool holding device, the combination of a supporting member, a tool carrying member, said carrying member being pivotally held on said supporting member and supporting a plurality of tools, and means for moving said pivoted member endwise relatively to said tool holding device to place any of said tools in operative relation to the work.

6. In a tool holding device, the combination of a supporting member, a tool carrying member including a rod having a head pivoted on one end thereof, a plurality of tools secured in said head, said supporting member having an enlarged portion adapted to support said head in different positions relatively to the work, and a portion co-operating with said rod to hold said head in adjusted position relatively to said supporting member.

7. In a tool holding device, the combination of a supporting member and a tool carrying member, said supporting member comprising a shank and having an enlarged portion on one end thereof, said carrying member comprising a rod movable endwise of said shank and having a head pivoted on one end thereof adapted to support a plurality of tools, said head being movable relatively to said rod into various operative relations to said enlarged portion, and means cooperating with said rod to lock said head in adjusted position relatively to said enlarged portion.

8. In a tool holding device, the combination of a supporting member and a tool carrying member, said carrying member being pivotally held on said supporting member and supporting a plurality of tools, means on said tool carrying member movable into one or another of a plurality of recesses on said supporting member to place one or another of said tools in operative position relative to the work, and means for locking the parts to hold the selected tool in said operative position.

9. In a tool holding device, the combination of a supporting member and a tool carrying member, said carrying member being pivotally held on said supporting member and supporting a plurality of tools, a stud on said tool carrying member and a plurality of recesses on said supporting member, a slidable part on which said tool carrying member is pivoted and which is movable relatively to said supporting member whereby said tool carrying member may be moved relatively to said supporting member to place said stud in one or another of said recesses to position one or another of said tools in operative relation to the work, and means for locking said slidable part against movement to positively hold said stud in the selected recess.

10. In a tool holding device, the combination of a supporting member and a tool carrying member, said carrying member being pivotally held on said supporting member and supporting a plurality of tools, a stud on said tool carrying member and a plurality of recesses on said supporting member, a slidable part on which said tool carrying member is pivoted and which is movable relatively to said supporting member whereby said tool carrying member may be moved relatively to said supporting member to place said stud in one or another of said recesses to position one or another of said tools in operative relation to the work, an intermediate recess on said supporting member into which said stud may be moved to place a plurality of said tools simultaneously into operative relation to the work, and means for locking said slidable part to positively hold said stud in the selected recess.

11. In a tool holding device, the combination of a supporting member and a tool carrying member, said supporting member comprising a shank and having an enlarged portion on one end thereof, said carrying frame having a head movable relatively to said enlarged portion and adapted to support a plurality of tools, a stud on one of said members adapted to enter one or another of a plurality of recesses on the other of said members to place one or another of said tools in operative relation to the work, a rod movable on said shank and to which said head is pivotally connected, means on said shank for locking said rod to hold said stud in the selected recess and which permits said rod to be released and moved to allow said head to be moved to place said stud in another recess.

12. In a tool holding device, the combination of a supporting member and a tool carrying member, said supporting member comprising a shank and having an enlarged portion on one end thereof, said carrying frame having a head movable relative to said enlarged portion and adapted to support a plurality of tools, a stud on one of said members adapted to enter one or another of a plurality of recesses on the other of said members to place one or another of said tools in operative relation to the work, one of said recesses being so positioned as to cause the head to present a plurality of tools simultaneously to the work, a rod movable on said shank and to which said head is pivotally connected, means on said shank for locking said bar to hold said stud in the selected recess.

13. In a dressing tool holder, the combination of a supporting member having a shank, a carrying frame comprising a bar slidable in said shank and having a head pivoted on one end thereof, a plurality of dressing tools rotatably mounted on said head, interlocking parts on said head and said supporting member which are adjustable to different relative positions for presenting one or another dressing tool to the surface to be dressed, locking means on the opposite end of said shank adapted to hold the selected dressing tool in operative position, and which may be actuated to release and allow said bar to slide in said shank so that said head may be swung about its pivotal connection with said rod to change the relative positions of said adjustable parts when it is desired to place another tool in operative relation to the surface to be dressed.

14. In a tool holding device, the combination of a supporting member, a tool carrying member movable thereon and having means for supporting a plurality of tools, and means for holding a plurality of tools in operative relation to the work and for permitting said tool carrying member to move relatively to said supporting member to a limited extent to enable said tools to adjust themselves relatively to the work.

15. In a tool holding device, the combination of a supporting member, a tool carrying member pivotally supported on said supporting member and having a plurality of tools journalled thereon, said tool carrying member being adapted to be locked in various positions relatively to said supporting member to place one or another tool into operative relation to the work, and means for moving the pivotal connection between said members relatively to said supporting member to move said members out of locking engagement.

16. In a tool holding device, the combination of a supporting member, a tool carrying member pivotally supported on said supporting member and having a plurality of tools journalled thereon, said tool carrying member being adapted to be locked in various positions relatively to said supporting member to place one or another tool into operative relation to the work, means for moving the pivotal connection between said members relatively to said supporting member to move said members out of locking engagement, and means for locking said pivotal connection against displacement relatively to said supporting member to hold said members in the desired relative positions.

17. In a dressing tool holder for grindstones, the combination of a tool carrying head having a plurality of dressing tools journalled thereon, a hollow shank portion, a rod arranged in said hollow shank portion and on which said head is pivotally secured, means on said hollow shank adapted to engage said head for holding the same in various positions to place any of said tools into operative relation to the stone, and means for locking said rod relatively to said shank to hold said head in the adjusted position.

Witness our hands this 20th day of January, 1920.

FREDRICK W. ROBERTS.
RALPH R. ROBERTS.

Witnesses:
A. C. HAINES,
R. M. KINZLY.